March 4, 1947.   C. A. BREEZE   2,416,898
FERTILIZER DISTRIBUTOR
Filed June 30, 1944
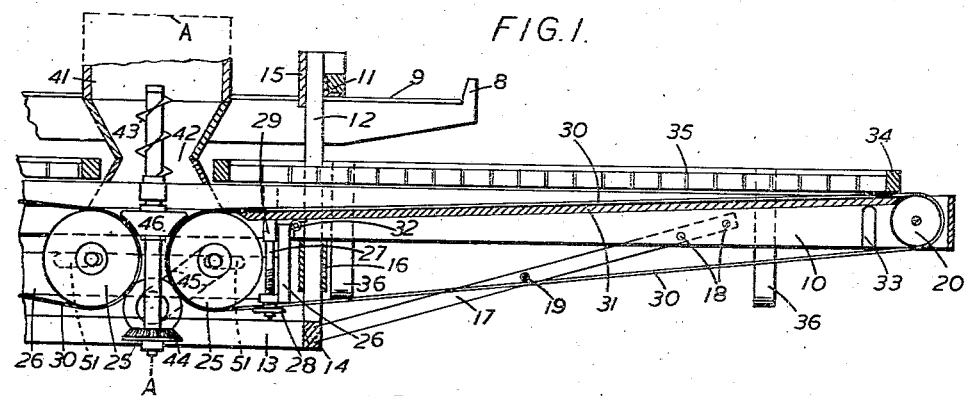
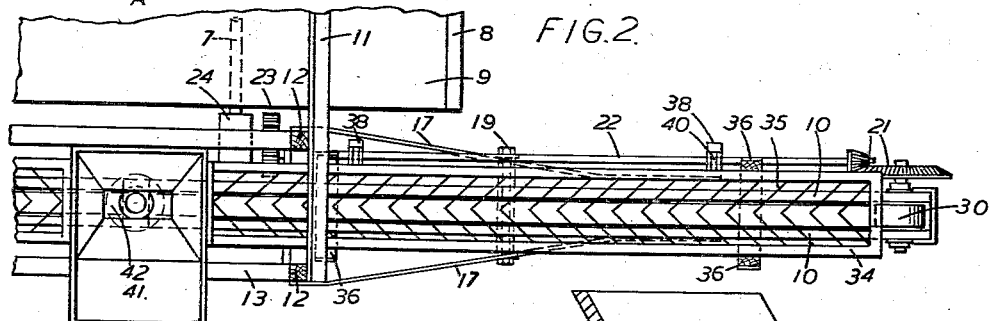
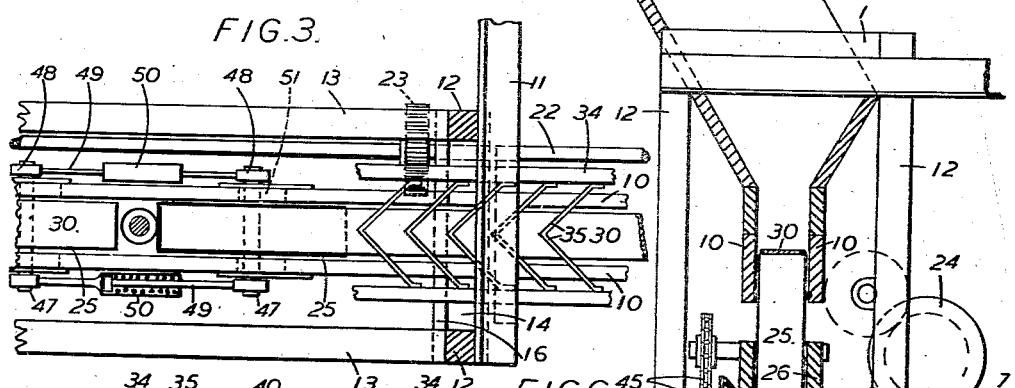
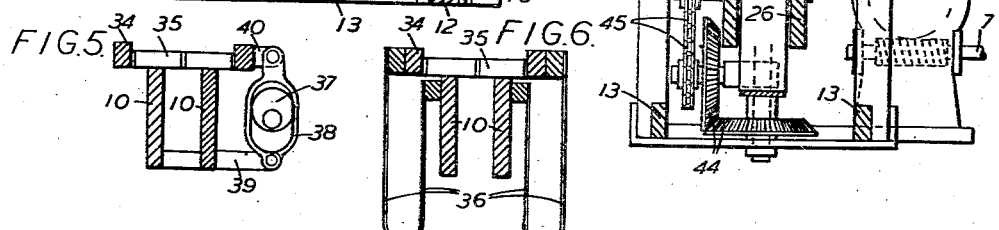
Inventor:
Charles Alfred Breeze
By Williams, Bradbury & Hinkle
Attorneys.

Patented Mar. 4, 1947

2,416,898

UNITED STATES PATENT OFFICE 2,416,898

FERTILIZER DISTRIBUTOR

Charles Alfred Breeze, Aberdeen, Scotland

Application June 30, 1944, Serial No. 543,031
In Great Britain July 12, 1943

19 Claims. (Cl. 275—2)

This invention relates to fertilizer distributing machines of the kind in which the machine is supported on wheels and carries the supply of fertilizer in a hopper, and in which the fertilizer is spread by a transverse conveyor belt to which the fertilizer is delivered by the hopper.

According to my invention a pair of oppositely travelling conveyor belts which form the bottom of a trough arranged transversely of the machine meet at their lower ends below the outlet from a feed hopper and are inclined with respect to and towards the outer ends of the upper side edges of the distributing trough, over the upper edges of which the fertilizer is delivered either by overflow or by positive ejection.

By this means, uniform discharge of the fertilizer over the entire length of the trough transversely to the direction of motion of the machine is obtained, and the rate of discharge can be varied by altering the inclination of the conveyor belts with respect to the upper side edges of the trough, and/or by varying the speed of the belts.

The belts which form the bottom of the trough are preferably of adjustable inclination and incline upwards towards the ends of a fixed trough with horizontal upper side edges. Alternatively, the belts may be horizontally arranged and the trough may be in two halves of opposite and preferably adjustable inclination forming adjustable inclined upper side edges to the trough, or both the belts and the trough may be of adjustable inclination with respect to one another. In each case the trough becomes progressively and uniformly shallower away from the hopper, thus causing the fertilizer to be distributed over the edges of the trough the entire width of the machine.

In the preferred manner of carrying out my invention, the lower rollers around which the belts pass are vertically adjustable within the trough to vary the inclination of the belts, which also pass over outer rollers at the ends of the trough. One or both rollers of each belt is or are mechanically driven, either from the wheels of the vehicle supporting the hopper and trough, or from a power unit, which may be the power unit of the tractor vehicle, if the machine is tractor-driven. The upper run of each belt passes over a rigid supporting surface adjustable in inclination in unison with the belt. The belt rollers may be driven through variable speed gearing for varying the speed of the belts.

If the fertilizer is to be positively discharged from the belts, scrapers or other stationary or movable ejecting devices may cooperate with the belts to sweep the fertilizer over the edges of the trough.

The accompanying drawings show a fertilizer distributor according to the preferred form of my invention, the machine shown being adapted for attachment to the rear of a tractor-drawn vehicle.

Fig. 1 is a vertical sectional view showing rather more than one half of the machine. The left-hand half of the machine is substantially a duplicate of the right-hand half shown in Fig. 1. The rear of the tractor-drawn vehicle is also shown.

Fig. 2 is a plan view of the portion of the machine and rear portion of the tractor-drawn vehicle shown in Fig. 1.

Fig. 3 is a fragmentary plan view of the parts of the machine beneath the hopper, the hopper being omitted and part of the scraper being broken away for convenience of clearer illustration of the parts.

Fig. 4 is a vertical cross-sectional view of the machine, showing the hopper in section.

Figs. 5 and 6 are cross-sectional views showing the trough and scraper, Fig. 5 showing the eccentric drive for the scraper and Fig. 6 showing the manner in which the scraper is resiliently mounted.

The machine illustrated derives its power drive from a shaft 7 which is mounted on the tractor-drawn vehicle 8, the fertilizer being carried in bulk on the platform 9 of the vehicle 8.

The fertilizer distributing machine is symmetrical about a vertical plane which passes through the centre line A—A (Fig. 1) and only one half of the machine is shown in Figs. 1 and 2. The machine comprises a horizontal trough formed by a pair of parallel trough sides 10 which are supported in a position transversely to the direction of travel of the vehicle 8. To this end, longitudinal angle bars 11 are removably secured to the platform 9 and extend rearwards therefrom. Secured to the angle bars 11 are vertical posts 12 which are connected together by cross bars 13, 14, 15 and 16 to form a fixed rectangular framework to which the trough sides 10 are secured, so that they extend outwards in opposite directions therefrom. The outer ends of the trough sides 10 are supported by the provision of inclined struts 17 each secured at one end to the lower end of one of the posts 12 and secured at the other end at 18 to one of the trough sides 10. The struts 17 may be braced together by a spacing bolt 19. Mounted between the outer ends of the trough sides 10 is a roller 20 driven by bevel gearing 21 from a shaft 22 which extends alongside the trough from end to end thereof. On the shaft 22 is a gear wheel 23 driven by gearing in a gear box 24 to which the power shaft 7 is connected. Midway between the ends of the trough is a pair of rollers 25 mounted in an adjustable frame 26. The frame 26 is adjustable in a vertical direction by means of screws 27 and hand-wheels 28, the screws 27 being secured by straps 29 to the trough sides 10. Two endless belts 30, running right and left respectively, pass around the pulleys 20 and 25 and form the bottom of the trough, the upper run of each belt being supported by a false bottom 31 hinged at 32 to the adjustable frame 26 and resting near its outer end on a support 33. Mounted over the trough is a pair of scraper frames 34 fitted with V-shaped scraper blades 35. Each scraper frame 34 is flexibly supported by U-shaped flat springs 36 one limb of which is secured at its upper end to one of the trough sides 10, the other limb of the U-shaped spring being secured to the scraper frame, which is caused to reciprocate transversely by the provision on shaft 22 of eccentrics 37 which drive eccentric straps 38 pivoted (Fig. 5) to a bracket 39 projecting from one of the trough sides, the upper end of the eccentric strap 38 being articulated to an arm 40 secured to the side of the scraper frame.

The fertilizer to be distributed is charged into a central hopper 41, having a contracted neck 42. A vertical worm 43 assists in feeding the fertilizer to the belts, the shaft of worm 43 being driven by bevel gearing 44 and chain gearing 45 from the spindle of one of the belt rollers 25. A floating block 46 (Fig. 1) prevents the fertilizer from falling between the rollers 25. Block 46 fits between the trough sides 10 and rests on belts 30. The block 46 is centrally apertured for the passage of the shaft of worm 43, the block 46 being thus free to rise or fall with the rollers 25 when frame 26 is adjusted vertically.

The shafts 47 of rollers 25 are extended to receive collars 48 on the ends of rods 49 which are coupled together by a spring coupling 50 (one of which is shown in section in Fig. 3). The roller shafts 47 are movable in slots 51 (Fig. 1) and the spring couplings 50 thus serve to tension the belts 30 one against the other.

The action of the machine is as follows: Fertilizer is fed from the platform 9 to the hopper 41 and passing through the neck 42, assisted by the worm 43, falls on to the belts 30 and is carried outwards on the belts to right and left. By reason of the inclination of each belt towards the upper edges of the trough sides 10, the fertilizer as it passes along, rises above the edges of the sides 10 and is scraped off by the blades 35 of the reciprocating scraper frames 34.

The quantity of fertilizer to be distributed can be varied by any one of the following methods or any combination thereof. A relatively coarse adjustment may be effected by substituting gear wheels of different velocity ratio for the bevel gearing 21 or by the provision of change-speed gearing in the gear box 24, thus varying the speed of the belts in relation to the speed of shaft 7. A finer adjustment may be effected by raising or lowering the adjustable frame 26 by manipulating the hand wheels 28, thus raising or lowering the rollers 25 to vary the inclination of the belts 30.

It will be understood that the subordinate details of the machine are capable of modification within the scope of the appended claims. The scraper shown is given only as an example and may be omitted or replaced by any other suitable stationary or movable device for ejecting the fertilizer from the moving belts.

I claim:

1. A distributor comprising a frame, a pair of aligned endless conveyor belts, rollers on said frame supporting said belts, means for traversing said belts in opposite directions so that their upper runs travel away from each other, a hopper on said frame arranged to discharge material on to said belts where they meet, a pair of parallel trough sides mounted on said frame one at each side of said belts which with said sides form the movable bottom of a trough, and means for supporting the upper runs of said belts in an inclined position in relation to the upper edges of said trough sides.

2. A distributor comprising a frame adapted for attachment to the rear of a tractor vehicle, a trough mounted on said frame transversely to the direction of travel of the vehicle, said trough being formed as to its sides by a pair of parallel side members, a pair of aligned endless belts forming the bottom of said trough, means for driving said belts in opposite directions to cause their upper runs to travel away from each other, a hopper arranged to discharge on to the meeting ends of said belts, and means for supporting the upper runs of said belts in an inclined position relatively to the upper edges of said side members, whereby the upper run of each of said belts as it moves outwards approaches nearer to the upper edges of said side members, thereby to cause material on said belts to overflow said side members.

3. A distributor comprising a transportable frame, a trough mounted on said frame in a direction transverse to the direction of transportation of said frame, said trough being formed as to its sides by a pair of parallel side members and as to the bottom of the trough by a pair of aligned endless belts which meet substantially midway of the length of the trough, means on said frame for traversing said belts in opposite directions to cause their upper runs to travel away from each other, a hopper arranged to discharge over the meeting ends of said belts, means for supporting the upper runs of said belts in an inclined position in relation to the upper edges of said parallel side members, and means for ejecting material carried by said belts over the upper edges of said side members.

4. A distributor comprising a frame, a pair of aligned endless conveyor belts, rollers on said frame supporting said belts, means for traversing said belts in opposite directions so that their upper runs travel away from each other, a hopper on said frame arranged to discharge material on to said belts where they meet, a pair of parallel trough sides mounted on said frame one at each side of said belts which with said sides form the movable bottom of a trough, means for supporting the upper runs of said belts in an inclined position in relation to the upper edges of said trough sides and means for varying the inclination of the upper runs of the belts to vary the rate of discharge of material carried by said belts over the upper edges of said trough sides.

5. A distributor comprising a trough constituted by a pair of horizontal trough sides and a pair of intermediate aligned endless belts which form the bottom of said trough, a frame on which said trough sides are transversely supported, rollers around which said endless belts pass, means for driving said belts in opposite directions so that their upper runs travel outwards away from each other, and means for supporting the upper runs of said belts in oppositely inclined positions rising upwards and outwards from each other.

6. A distributor comprising a trough having its bottom constituted by a pair of oppositely travelling endless belts positioned in said trough and presenting a trough which becomes progressively and uniformly shallower from the middle of the trough to the opposite extremities thereof, means for feeding material to said belts near the middle of the trough, and reciprocatory means for ejecting the material carried by said belts over the sides of said trough uniformly throughout the length of the belts as the material is progressively carried towards the opposite extremities of the trough.

7. A distributor comprising a pair of parallel trough sides, a pair of oppositely travelling endless belts positioned between said trough sides to form the movable bottom of a trough which becomes progressively and uniformly shallower from its middle portion to its opposite extremities, rollers around which the inner ends of said belts are passed, rollers supporting the outer ends of said belts, means for imparting traversing motion to said belts, and means for adjusting the rollers at the inner ends of said belts to vary the inclination of said belts.

8. A distributor comprising a trough which becomes progressively and uniformly shallower from its middle portion to its opposite extremities, said trough having a movable bottom constituted by a pair of oppositely travelling endless belts meeting in the middle portion of said trough, a rigid supporting surface for the upper run of each belt, means for adjusting the inclination of said belts, and means for adjusting the inclination of said supporting surfaces in unison with the belts.

9. A distributor comprising a trough having its bottom constituted by a pair of oppositely travelling endless belts positioned in said trough and presenting a trough which becomes progressively and uniformly shallower from the middle of the trough to the opposite extremities thereof and movable scraper devices operable over said trough for sweeping material carried by the belts over the sides of the trough.

10. A distributor symmetrical about a vertical centre line and comprising a vehicle frame, a pair of parallel trough sides supported in a position transversely to the direction of travel of said vehicle frame, an adjustable frame mounted for vertical adjustment on said vehicle frame, a pair of inner rollers mounted on said adjustable frame midway between the ends of the trough which is formed as to its sides by said trough sides, a pair of outer rollers mounted between said trough sides, one near each end of the trough, mechanism for rotating said outer rollers in opposite directions, and a pair of endless belts forming the bottom of said trough, each of said belts passing around one of the inner and outer rollers.

11. A distributor symmetrical about a vertical centre line and comprising a vehicle frame, a pair of parallel trough sides supported in a position transversely to the direction of travel of said vehicle frame, an adjustable frame mounted for vertical adjustment on said vehicle frame, a pair of inner rollers mounted on said adjustable frame midway between the ends of the trough which is formed as to its sides by said trough sides, a pair of outer rollers mounted between said trough sides, one near each end of the trough, mechanism for rotating said outer rollers in opposite directions, a pair of endless belts forming the bottom of said trough, each of said belts passing around one of the inner and outer rollers, a pair of rigid supporting surfaces, one beneath the upper run of each belt, a sliding support for the outer end portion of each of said supporting surfaces, and means hingedly attaching the inner ends of said supporting surfaces to said adjustable frame.

12. A distributor comprising a trough which becomes progressively and uniformly shallower from its middle portion to its opposite extremities, said trough being constituted by rigid trough sides enclosing a pair of oppositely travelling endless bands between them, said bands meeting in the middle portion of said trough, a scraper device mounted over the trough, and means resiliently connecting the scraper device to the trough sides for permitting restricted reciprocatory motion of said scraper device in a direction transverse to the direction of travel of said belts.

13. A distributor comprising a trough which becomes progressively and uniformly shallower from its middle portion to its opposite extremities, said trough being constituted by rigid trough sides enclosing a pair of oppositely travelling endless bands between them, said bands meeting in the middle portion of said trough, a scraper device mounted over the trough, and mechanism for reciprocating said scraper device in a direction transverse to the direction of travel of said belts.

14. A distributor comprising a trough which becomes progressively and uniformly shallower from its middle portion to its opposite extremities, said trough being constituted by rigid trough sides enclosing a pair of oppositely travelling endless bands between them, said bands meeting in the middle portion of said trough, a scraper device mounted over the trough, means resiliently connecting the scraper device to the trough sides for permitting restricted reciprocatory motion of said scraper device in a direction transverse to the direction of travel of said belts, and eccentric mechanism for reciprocating said scraper device.

15. A distributor comprising a trough which becomes progressively and uniformly shallower from its middle portion to its opposite extremities, said trough being constituted by rigid trough sides enclosing a pair of oppositely travelling endless bands between them, said bands meeting in the middle portion of said trough, a reciprocatory scraper frame mounted over said trough, a plurality of transverse scraper blades mounted in said frame, and mechanism for reciprocating said frame.

16. A distributor comprising a trough which becomes progressively and uniformly shallower from its middle portion to its opposite extremities, said trough being constituted by rigid trough sides enclosing a pair of oppositely travelling endless bands between them, said bands meeting in the middle portion of said trough, a reciprocatory scraper frame mounted over said trough, a plurality of transverse scraper blades mounted in said frame, said scraper blades being V-shaped in plan view and being parallel with one another, and mechanism for reciprocating said frame.

17. A distributor comprising a frame, means for attaching the frame to the rear of a tractor vehicle, a hopper centrally supported by said frame, said hopper tapering downwards towards a contracted neck and widening out below said neck, a trough supported on said frame transversely with respect to the direction of motion of the tractor vehicle, said trough being arranged symmetrically about the centre of said frame, a movable bottom to said trough constituted by a pair of parallel endless bands meeting beneath said hopper, mechanism for traversing said bands to cause their upper runs to travel outwards away from said hopper and to carry material from the hopper and reciprocatory means for ejecting the material carried by said bands over the sides of said trough uniformly throughout the length of said bands as the material is progressively carried outwards away from said hopper.

18. A distributor comprising a frame adapted for attachment to the rear of a tractor vehicle, a pair of trough sides supported by said frame and extending transversely to the direction of motion of the tractor vehicle and symmetrically with respect to said frame, a hopper mounted on said frame and disposed midway over the trough formed by said trough sides, a pair of inner rollers extending into the open bottom of said trough beneath said hopper, outer rollers mounted between said trough sides, one near each outer end of the trough, a pair of endless belts forming a movable bottom for said trough, each of said belts passing over one of said inner rollers and one of said outer rollers, a vertical worm extending upwards in said hopper, a vertical shaft carrying said worm and extending downwards between the inner rollers, a floating block apertured to slide on said shaft and to rest on said belts where they pass over said inner rollers, mechanism for driving said belts in opposite directions to cause the upper runs of said belts to move outwards, and mechanism for rotating the shaft carrying said worm.

19. A distributor comprising a trough, a carriage, means for supporting the trough in cantilever fashion from the carriage, an endless belt constituting a movable bottom for the trough, the upper run of said belt inclining upwards towards the outer end of the trough and towards the upper side edges of the trough, mechanism for traversing the belt in a direction to cause its upper run to move outwards towards the outer end of the trough, and reciprocatory means operable over the belt to progressively and uniformly discharge material carried by the belt over the sides of the trough throughout the length thereof.

CHARLES ALFRED BREEZE.

REFERENCES CITED

The following references are of record in the file of this patent:

UNITED STATES PATENTS

| Number | Name | Date |
| --- | --- | --- |
| 1,267,660 | Healy | May 28, 1918 |
| 2,280,234 | Harvey | Apr. 21, 1942 |
| 676,212 | Vansant | June 11, 1901 |

FOREIGN PATENTS

| Number | Country | Date |
| --- | --- | --- |
| 189,671 | British | Dec. 7, 1922 |